(12) United States Patent
Mizutani

(10) Patent No.: US 7,725,761 B2
(45) Date of Patent: May 25, 2010

(54) COMPUTER SYSTEM, FAULT TOLERANT SYSTEM USING THE SAME AND OPERATION CONTROL METHOD AND PROGRAM THEREOF

(75) Inventor: Fumitoshi Mizutani, Tokyo (JP)

(73) Assignee: NEC Corporation, Tokyo (JP)

( * ) Notice: Subject to any disclaimer, the term of this patent is extended or adjusted under 35 U.S.C. 154(b) by 509 days.

(21) Appl. No.: 11/299,913

(22) Filed: Dec. 13, 2005

(65) Prior Publication Data
US 2006/0129735 A1   Jun. 15, 2006

(30) Foreign Application Priority Data
Dec. 13, 2004 (JP) ............................. 2004-359272

(51) Int. Cl.
G06F 11/20 (2006.01)
(52) U.S. Cl. .......................................................... 714/5
(58) Field of Classification Search ...................... 714/5, 714/11
See application file for complete search history.

(56) References Cited

U.S. PATENT DOCUMENTS

| | | | | |
|---|---|---|---|---|
| 5,745,672 | A | * | 4/1998 | Stiffler ............................ 714/6 |
| 5,991,900 | A | * | 11/1999 | Garnett .......................... 714/56 |
| 6,112,311 | A | | 8/2000 | Beardsley et al. |
| 6,691,257 | B1 | * | 2/2004 | Suffin ............................ 714/43 |
| 2003/0182492 | A1 | * | 9/2003 | Watkins et al. .................. 711/5 |
| 2003/0182594 | A1 | * | 9/2003 | Watkins et al. ................. 714/11 |
| 2004/0186942 | A1 | * | 9/2004 | Olarig ......................... 710/313 |
| 2006/0080359 | A1 | * | 4/2006 | Powell et al. ............. 707/104.1 |

FOREIGN PATENT DOCUMENTS

| | | |
|---|---|---|
| JP | 9-34809 A | 2/1997 |
| JP | 9-81505 A | 3/1997 |
| JP | 9-97125 A | 4/1997 |
| JP | 10-187304 A | 7/1998 |
| JP | 2001-523855 A | 11/2001 |
| JP | 2004-280732 A | 10/2004 |
| JP | 2004-326151 A | 11/2004 |
| WO | WO 98/12657 A1 | 3/1998 |
| WO | WO 01/80006 A2 | 10/2001 |

* cited by examiner

Primary Examiner—Scott T Baderman
Assistant Examiner—Yair Leibovich
(74) Attorney, Agent, or Firm—Sughrue Mion, PLLC

(57) ABSTRACT

The present invention provides a high reliability fault tolerant computer system capable of constructing a redundant configuration employing PnP software. In duplexing systems, entities of IO bridges (actual IO bridges) which are connected to virtual bus and correspond each other is integrated into the systems as pseudo IO bridges, so that if the systems are physically disconnected each other, by emulating the actual IO bridge in another system, the pseudo-IO bridge can act as if a so-called PnP event in the IO bridge itself does not occur.

10 Claims, 5 Drawing Sheets

COMPUTER SYSTEM, FAULT TOLERANT SYSTEM USING THE SAME AND OPERATION CONTROL METHOD AND PROGRAM THEREOF

BACKGROUND OF THE INVENTION

1. Field of the Invention

The present invention relates to a computer system, a fault tolerant system using the same, an operation control method and a program thereof, and particularly an improvement of the fault tolerant computer system.

2. Description of the Prior Art

Recently, performance of general purpose CPUs widely used have been significantly increased, and by installing a general purpose operating system (OS) on a workstation or a server using such general purpose CPU, high-performance and inexpensive system is provided. As a result, even in applications where a very expensive large-scale computer has been conventionally used, a system using a high-performance and inexpensive general purpose CPU is used.

On the other hand, mission-critical applications where a system needs to continuously run 24 hours per day are also increasing. In these applications, it is important to construct the system such that system down is prevented.

However, In such a general purpose CPU and a general purpose OS, due to lack of CPU's own fault detection function, and in the case of hardware failure in a general purpose OS, due to lack of fault notification means and definition of a fault processing for a response upon failure, hardware failure causes system breakdown. Therefore, in order to provide a high reliability system, it is required to add a special peripheral circuit or to develop a dedicated OS, thereby making it difficult to develop high reliability systems while following the speed at which normal general purpose CPU systems are developed. For this reason, cost-performance differences between normal systems and high reliability systems tend to increase.

Therefore, in order to provide a high reliability computer system having commonality with a computer system using general purpose CPU, such as a fault tolerant computer system, for example, as described in Japanese Patent Laid-Open No. 09-034809, CPUs performing the same processing synchronously with the same clock, a device for detecting a failure of a CPU and disconnecting the fault CPU and a system for disconnecting a fault IO path by CPU instructions depending on IO failure are proposed. However, in a general purpose OS widely used, due to the fact that a notification method for hardware failure and a fault processing function are not provided, there is a problem that system breakdown occurs.

Therefore, in order to use a general purpose OS, a configuration is required in which hardware failure and OS are completely separated. For example, referring to National Publication of International Patent Application No. 2001-523855, a calculation element (CE) and a IO control part (IOP) are respectively configured by one computer system and each element is connected multiple times, so that redundancy is achieved. Communication is performed between elements, and a CE or IOP is disconnected in which failure is detected.

For example, for the IO control part, hardware is virtualized from OS viewpoint. Although an IO control part in which failure occurs may be paused, this failure does not affect OS directly, and occurrence of a failure can be concealed by detecting the failure and returning a normal response by remaining redundant IO control parts.

However, in this system, a CPU and an IO require one computer respectively, and further, to make redundant configuration, a number of computers required to achieve redundancy is needed. Further, Since each computer performs asynchronously or differently, extra OS licenses needs to be installed and system become expensive.

There is a system that allows to change connection configuration of an IO device or an IO bridge on a bus dynamically by using standard PnP (Plug & Play) software on a general purpose OS, therefore it is conceivable that a high reliability fault tolerant computer system is constructed by adopting redundant configuration system using such PnP software.

However, For an IO bridge PnP processing, complete dynamic configuration change is not supported. For example, in connecting an IO bridge, since the amount of memory space allocation requested by a device connected to the IO bridge, and the number of devices are not determined, memory space is not free to be allocated to connected IO bridges due to limitation on PnP control software or OS (typically defined by a fixed value), thereby the number and the type of devices are limited.

For example, in the case of PnP connection of an IO bridge, because OS can not determine how many resources are required for the IO bridge, certain memory space is allocated and can not be changed thereafter. For this reason, when a further IO bridge or device is connected under the connected IO bridge, an IO bridge or a device can not be connected which requires more memory space than allocated to the first IO bridge.

Also, if a plurality of devices are connected, due to the fact that required memory space may exceed memory space allocated to the IO bridge, some devices may fails to allocate memory resource depending on the number of connected devices. This limitation on memory resource allocation becomes serious problem in a multistage IO bridge configuration system such that a plurality of IO bridges are connected under a PnP connected IO bridge.

Conventionally, due to the above limitation, in order to construct a fault tolerant computer system with a system using PnP software, it is required to modify OS standard PnP control software and OS itself to sufficiently allocate resources to the IO bridge.

It is an object of the invention to provide a high reliability and high availability computer system capable of constructing a redundant configuration without the need to modify existing general purpose OS functions, a fault tolerant system using the same, a operation control method and a program thereof.

BRIEF SUMMARY OF THE INVENTION

An computer system according to the present invention includes a CPU, a memory, a bus and an IO bridge for connecting an IO device to the bus, wherein the computer system including a pseudo-IO bus bridge, the pseudo-IO bus bridge is disconnected from the bus during a redundant configuration in which another system is connected to the bus, and holds a setting information of the IO bridge to emulate the IO bridge in the other system during a stand-alone configuration in which the other system is disconnected from the bus.

In a fault tolerant system according to the present invention, the computer system described above is configured as the redundant configuration.

A operation control method of a fault tolerant system includes a first and second computer systems interconnected through a bus to form a redundant configuration, each of the systems having a CPU, a memory, an IO bridge for connecting an IO device to the bus and a pseudo-IO bus bridge emulating the IO bridge in another system, the operation control method including the steps of: causing the pseudo-IO bridge to hold an initial setting information of an IO bridge of another system during a stand-alone configuration; forming the redundant configuration; and disconnecting the pseudo-IO bridge from the bus and copying the initial setting information held by the pseudo-IO bridge to an IO bridge in the other system during the redundant configuration.

A program according to the present invention is a program for performing a operation control method of a fault tolerant system, the fault tolerant system including a first and second computer systems interconnected through a bus to form a redundant configuration, each of the systems having a CPU, a memory, an IO bridge for connecting an IO device to the bus and a pseudo-IO bus bridge emulating the IO bridge in another system, the program including: a process for causing the pseudo-IO bridge to hold an initial setting information of an IO bridge of another system during a stand-alone configuration; a process for forming the redundant configuration; and a process for disconnecting the pseudo-IO bridge from the bus and copying the initial setting information held by the pseudo-IO bridge to an IO bridge in the other system during the redundant configuration.

DETAILED DESCRIPTION OF THE PREFERRED EMBODIMENTS

Figure 1:
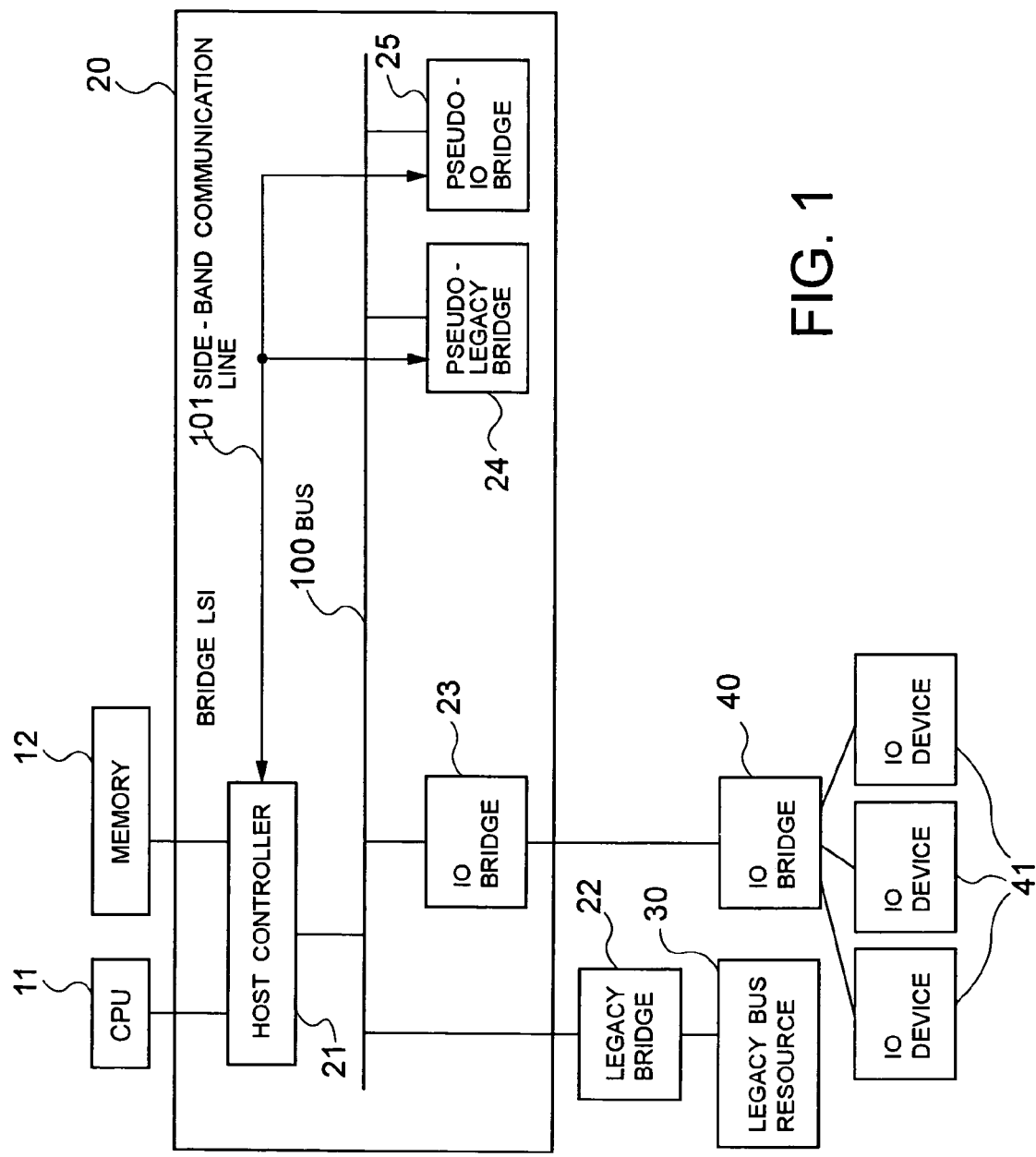
FIG. 1 is a system configuration diagram according to the present invention.

An embodiment of the present invention is described below with reference to the drawings. FIG. 1 shows a single computer system configuration to configure a fault tolerant system according to the present invention. A CPU 11 and a memory 12 are connected to a host controller 21, which is connected to a bus 100. An IO bridge 23 connected to the bus 100 can connect a device supporting hot-plug, or other IO bridges 40, 41 for connecting the hot-plug support device.

The bus (the bus connected to the CPU 11 via a single bridge level) 100 is configured as a virtual bus within one bridge LSI 20 including the host controller 21 and the IO bridge 23. Further, a pseudo-IO bridge 25 is connected to the virtual bus 100. This pseudo-IO bridge 25 is a logical device arranged within the bridge LSI 20, and has a function of holding a setting information for the entity of the IO bridge. This setting information is at least a configuration information such as a device identification information and a memory space allocation information. The initial value of this setting information is intended to preset by OS.

As will be described below with reference to FIGS. 2 and 3, by connecting to another system (a system B in FIG. 2) to make duplexing, this pseudo-IO bridge 25 is disconnected from the bus 100 and can not be recognized when the corresponding entity of the IO bridge (an IO bridge 23B in FIG. 2) is connected. In this duplexing, the bus 100 is shared with the system (B).

A legacy bridge 22 and a pseudo-legacy bridge 24 are connected to the bus 100, and a legacy bus resource 30 is connected to the legacy bridge 22. A side-band communication line 101 allows the host controller 21 to access to the pseudo-IO bridge 25 or the pseudo-legacy bridge 24 not through the bus 100.

Therefore, an initial setting information held by the pseudo-IO bridge 25 is accessed by the host controller 21 through the side-band communication line 101 and copied to the entity of the IO bridge in the other system.

Figure 2:
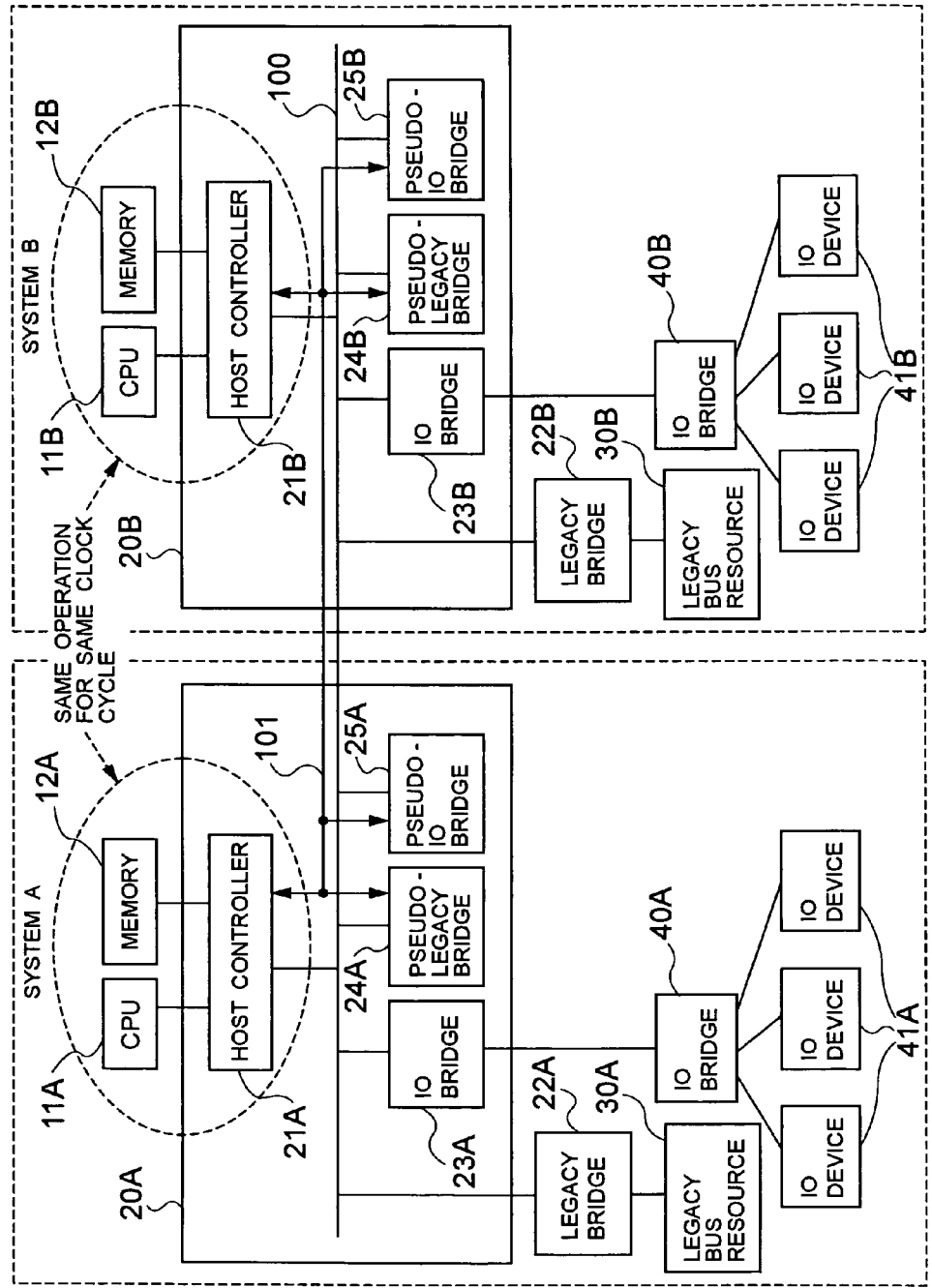
FIG. 2 is an example of a fault tolerant computer system using the configuration in FIG. 1.

FIG. 2 is a duplex system using the system of FIG. 1 as systems A, B. In FIG. 2, the same components in system A as FIG. 1 is denoted as the same number along with "A", while the same components in system B is denoted as the same number in FIG. 1 along with "B".

By connecting a bridge LSI 20A with a bridge LSI 20B, CPUs 11A, 11B in each system can access to the IO bridges 23A, 23B, IO bridges 40A, 40B under the IO bridges 23A, 23B and IO devices 41A, 41B via the virtual bus 100.

Figure 4:
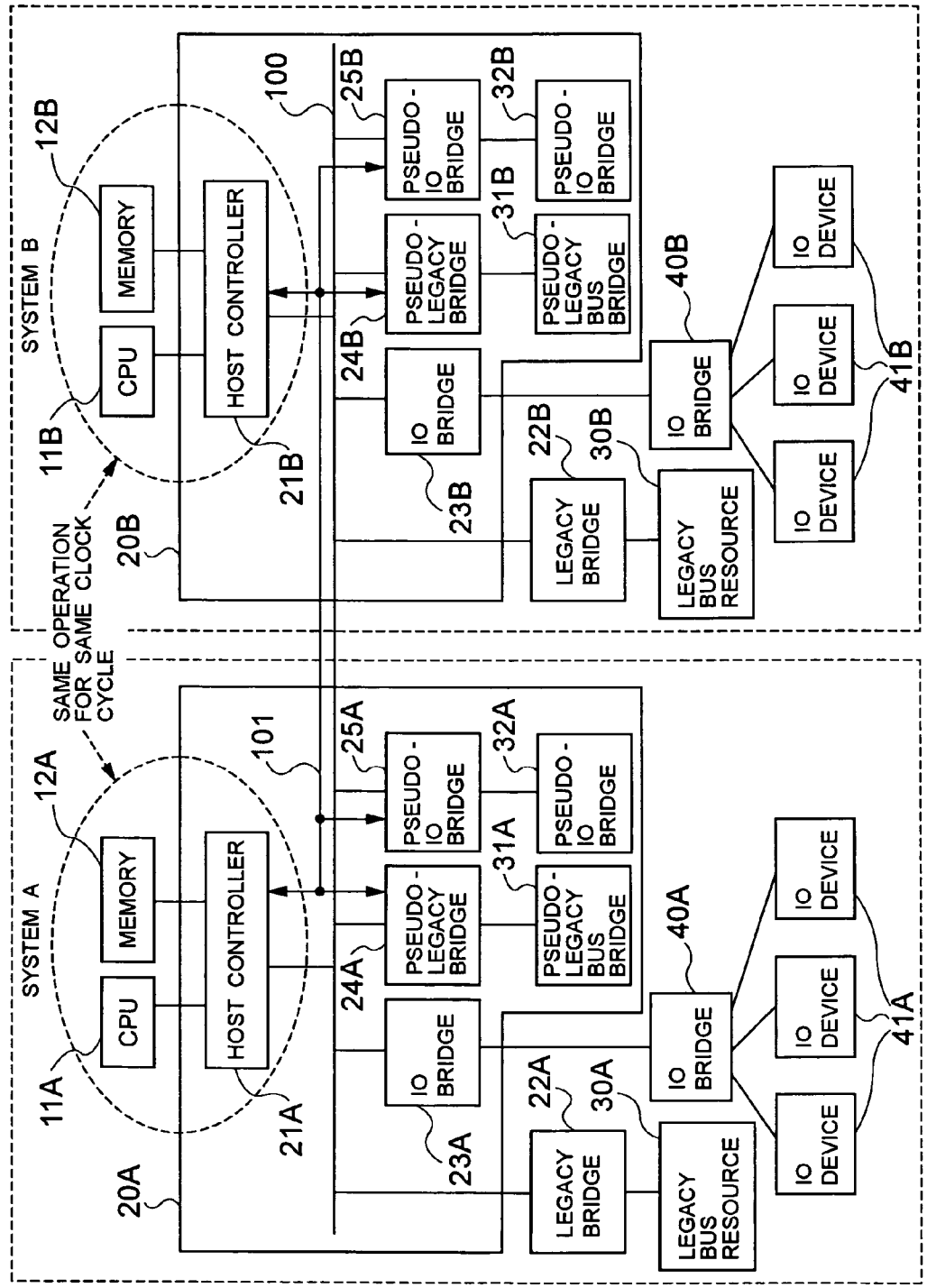
FIG. 4 is another example of a fault tolerant computer system using the configuration in FIG. 1.
Figure 5:
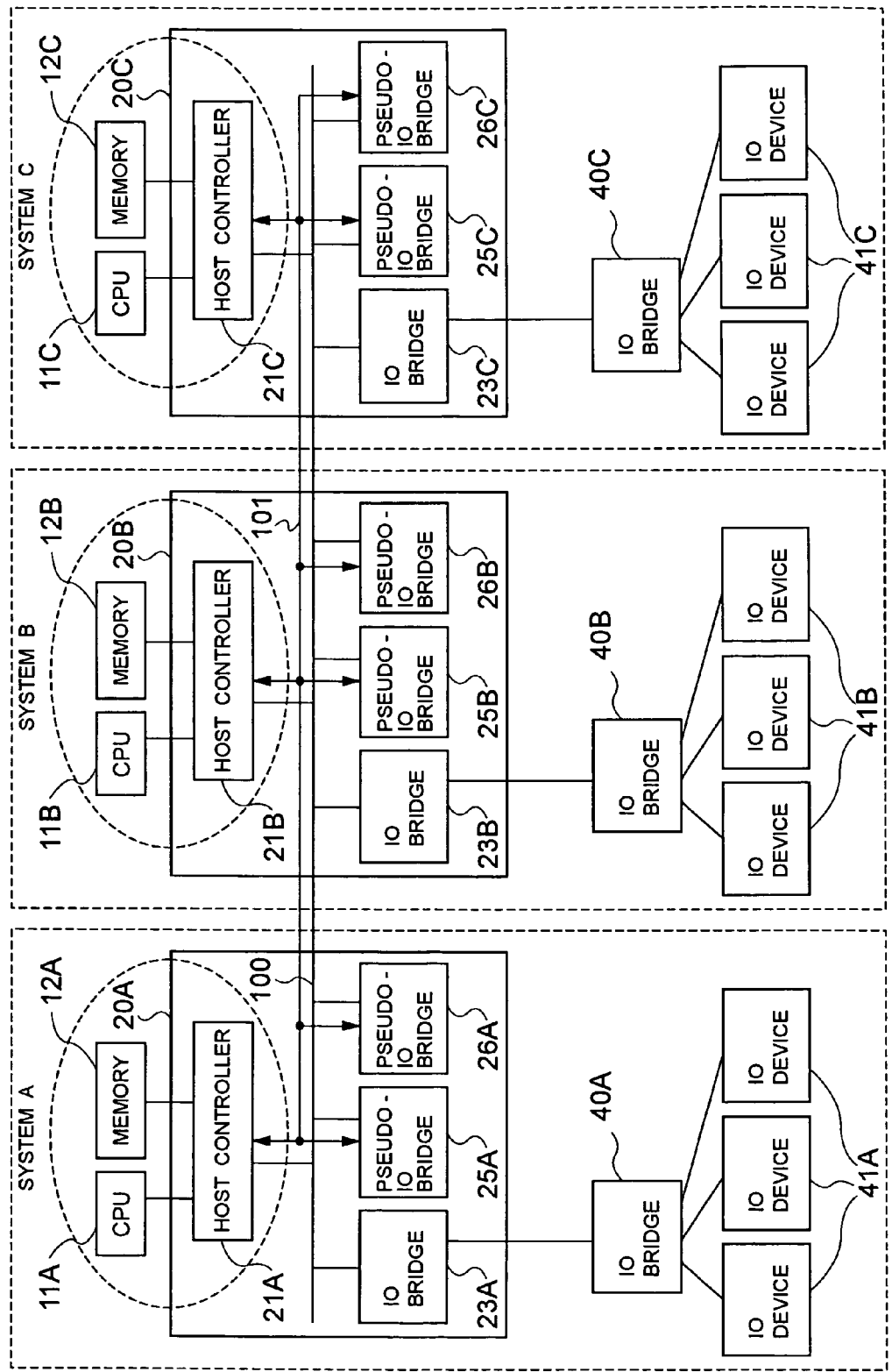
FIG. 5 is still another example of a fault tolerant computer system using the configuration in FIG. 1.

The CPUs 11A, 11B, memories 12A, 12B and host controllers 21A, 21B of each system A, B operate as CPUs in one system by operating the same process in the same clock cycle (area shown as dotted lines; the same can be said for FIGS. 4, 5).

When the system is running as the duplex configuration, since the information set in the entity of the IO bridge changes, the pseudo-IO bridge 25A operates to snoop an access to the entity of the IO bridge 23B in the connected system B to hold a configuration information set in this entity of IO bridge 23B, so that the most recent setting information of the entity of the IO bridge 23B is copied to the pseudo-IO bridge 25A.

On the other hand, the pseudo-IO bridge 25B also snoops an access to the entity of the IO bridge 23A in the connected system A to hold the most recent configuration information set in this entity of IO bridge 23A.

The host controllers 21A, 21B can access via side-band communication 101 to the configuration information held by each IO bridge 25A, 25B even if the entity of the IO bridge is connected and each IO bridge 25A, 25B is not recognized by the bus 100. As described above, this allows the setting information of each pseudo-IO bridge to be copied to the respective entity of the IO bridge. Alternatively, for read access to the IO bridge, the pseudo-IO bridge responds, and for write access, the pseudo-IO device snoops and access is also transmitted to the entity IO bridge, so that the operation for copying the configuration information held by the pseudo-IO bridge to the entity of the IO bridge can be simplified.

Figure 3:
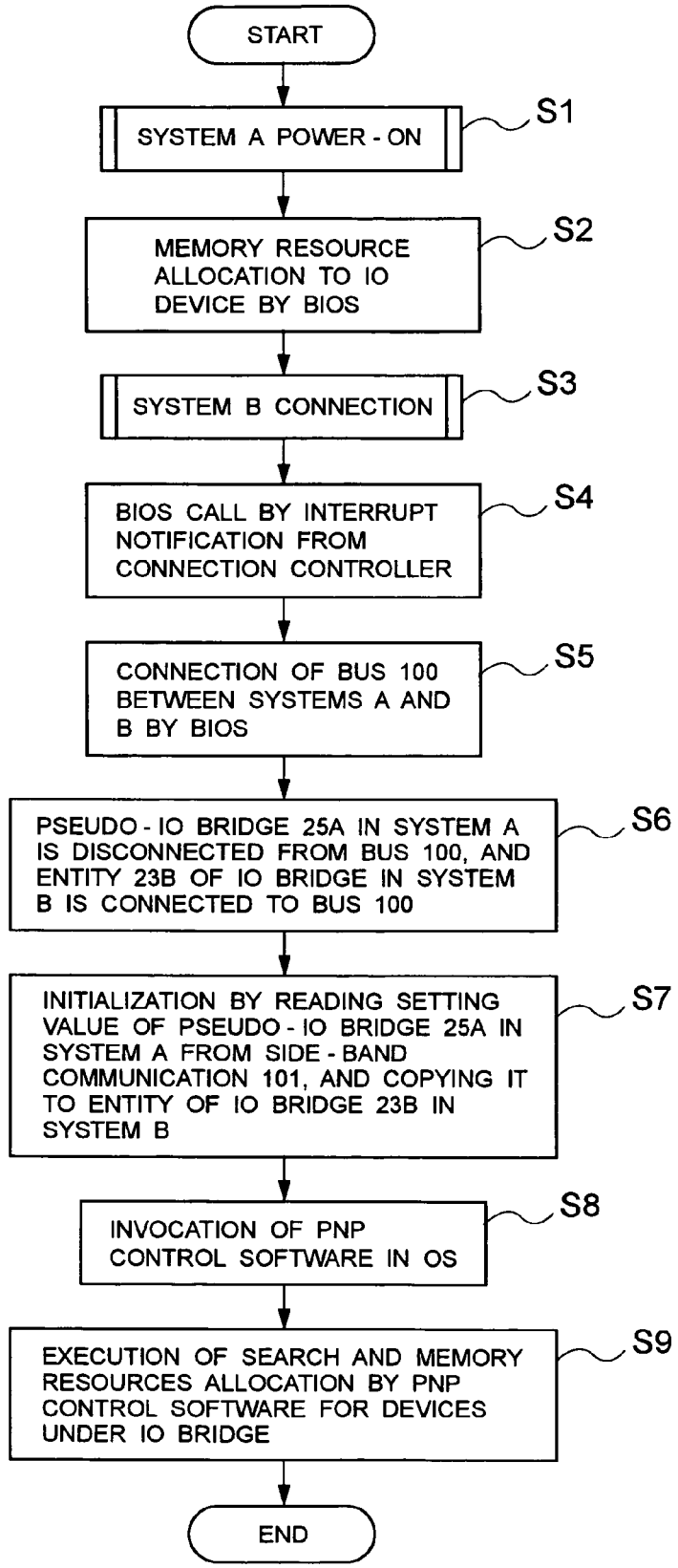
FIG. 3 is a flow chart describing the operation in FIG. 2.

With reference to FIG. 3, an operation for forming a duplex configuration shown in FIG. 2 using the system in FIG. 1 is described. First, there is only the configuration in FIG. 1 or system A at power-on (step S1). The memory resources allocation to the IO device 41A including the IO bridge 24A at this point is done by a BIOS (Basic Input/Output System) that is a basic software in OS (step S2).

At this point, the memory space allocation to the pseudo-IO bridge 25A is set at duplexing as shown in FIG. 2 such that sufficient volume is allocated including memory space required by devices connected under the IO bridge entity 23B, and devices that would be newly connected. The memory space allocated at this point is also employed after OS is started.

At the situation shown in FIG. 1, after power-on, assuming that the system in which OS is started is the system A, the redundant configuration in FIG. 2 is formed when the system B is connected (step S3). Using the connection between systems A and B, by a BIOS call (Step S4) with an interrupt notification from a connection controller not shown, the BIOS made the connection of the bus 100 between the systems A and B (step S5). This connection controller is, for example, a circuit on a motherboard for controlling the insertion and withdrawal of a livewire of an IO interface such as PCI (Peripheral Component Interconnect) hot plug controller and it is a well-known circuit, therefore it will not be explained.

At this point, the pseudo-IO bridge 25A in the system A is disconnected from the bus 100, and instead the entity of the IO bridge 23B in the system B is connected (step S6). Then the host controller performs initialization by reading the setting value set in the pseudo-IO bridge 25A in the system A from the side-band communication 101, and copying it to the entity of the IO bridge 23B in the system B (step S7). The same can be said for the pseudo-IO bridge in the system B and the entity of the IO bridge in the system A.

After this processing, a PnP control software for OS is invoked (step S8), a search or memory resources allocation is performed by the PnP control software only for devices under the IO bridge (S9) since a change in the configuration of the IO bridge is not recognized by the software.

In PC/AT (Personal Computer/Advanced Technology) architecture, since the legacy bridges 22A, 22B and the legacy bus resources 30A, 30B need to be single in the system, as the function of the host controllers 21A, 21B, accesses to the legacy bridges 22A, 22B and the legacy bus resources 30A, 30B are controlled to send either legacy bridge/legacy bus resource.

Since the legacy bridge/legacy bus resource is single in a system and must exist in the system, when the actual entity of the legacy bridges 22A, 22B or the legacy bus resources 30A, 30B can not be used due to failure, etc. or are removed for maintenance, exchange, etc., the pseudo-legacy bridge 24A, 24B can alternately perform the functions of the legacy bridge/legacy bus resource until the accesses of the host controllers 21A, 21B are switched.

In this way, in the duplexing system, if IO bridges connected to the virtual bus 100 and corresponding to each other are integrated as the pseudo-IO bridges into each system and the systems are physically disconnected, the pseudo-IO bridges can emulate the actual IO bridge in another system, so that it is possible to act as if a so-called PnP event does not occur.

Further, by providing a pseudo-IO bridge corresponding an actual IO bridge affected by a connection or disconnection of a virtual bus on the virtual bus at which the connection and disconnection occur, dynamic connection and disconnection of an IO bridge is concealed for which free allocation of memory space is impossible using a standard PnP software. Since sufficient memory resources is allocated to the IO bridge at power-on, required memory resources can be allocated to devices connected to the bridge without modifying OS or its standard PnP control software.

Next, another embodiment according to the present invention is described. In FIG. 1, the pseudo-IO bridge 25 can implement minimum functions to allocate memory space by the standard PnP software. Alternatively, the pseudo-IO bridge 25 can implement all or some functions of an actual device to temporally perform the functions of the actual device.

In FIG. 1, although the host controller 21, IO bridge 23 and the pseudo-IO bridges 24, 25 are integrated into one LIS 20, each IO bridge and pseudo-IO bridge can also be connected as another LSI external to the LSI 20.

In FIG. 2, although initialization is performed by reading the setting value set in the pseudo-IO bridge 25A in the system A from the side-band communication 101, and copying it to the entity of the IO bridge 23B in the system B, the copying can also be performed via the bus 100 by providing a function to temporally transfer the pseudo-IO bridge 25A in the system A to a device or a function being different from the entity of the IO bridge 23B in the system B.

FIG. 4, in which like reference numerals as FIG. 2 refer to like element, shows still another embodiment according to the present invention. In FIG. 4, connected to a system A is a pseudo-IO bridge 25A which acts as a IO bridge 23B in a system B along with a pseudo-IO bridge 32A which acts as a IO bridge 40B connected next to the IO bridge 23B in the system B. In this way, in a configuration that IO bridges are connected in a multistage way, if the configuration of the system is previously limited, the pseudo-IO bridges can be connected in a multistage manner. It is also possible to form a configuration as shown in FIG. 2 by adding a function to disable the function of the pseudo-IO bridge for each IO bridge.

In FIG. 5, system redundancy is provided in a triplex configuration. Each pseudo-IO bridge 25A, 26A in a system A corresponds to an entity of an IO bridge 23B, 23C in systems B, C respectively. Similarly, each pseudo-IO bridge 25B, 26B in a system B corresponds to an entity of an IO bridge 23A, 23C in systems A, C respectively, and each pseudo-IO bridge 25C, 26C in a system C corresponds to an entity of an IO bridge 23A, 23B in systems A, B respectively.

In this way, system redundancy can be increased according to the number of the pseudo-IO bridges in each system. Further, by adding disable function for each pseudo-IO bridge, the configuration can be formed according to system redundancy.

As described above, in a fault tolerant computer system according to the present invention, a high reliability computer system can be constructed by duplexing a CPU hardware which performs lock step operation and forming redundant configuration (e.g. software RAID1) while maintaining the system configuration (here, generally PC/AT architecture) including a combination of a general purpose CPU and a general purpose OS.

Further, in order not to lose the system availability in disconnecting the redundant CPU or the redundant IO controller for maintenance, exchange, etc., using a general purpose PnP/Hot Plug control software setting a boundary as a logical bus or a physical bus, hardware resources can be connected to form redundancy, or redundant hardware resources can be disconnected, so that a high reliability and high availability fault tolerant computer system can be provided without modifying existing general purpose OS functions.

It should be evident that the operation flow shown in FIG. 3 is achieved by a computer-readable program (software).

It is the first advantage of the present invention that duplexing of an IO device having IO space not supporting PnP is provided. This is because an IO device not supporting PnP that would otherwise necessarily exist in a system can be recognized by software as an always-exiting device by having this device virtually even if the hardware entity is physically disconnected. As a result, without using PnP control software, redundant configuration can be easily formed by BIOS (Basic Input/Output System) control.

It is the second advantage of the present invention that for PnP control in a system having multistage IO bridge, PnP control software for general purpose OS can be employed. This is because BIOS can reserve sufficient memory resources in advance by having a PnP connected IO bridge virtually before system duplexing. As a result, redundant configuration can be easily formed using PnP control software for general purpose OS BIOS.

It is the third advantage of the present invention that general purpose OS can be used by software without the need to consider duplexing hardware. This is because software does not need to consider CPU duplexing due to the fact that a CPU of each system performs the same operation by lockstep operation, and bridge configuration of the system recognized by software is always the same configuration for each system before and after hardware duplexing. As a result, redundant configuration can be easily formed using general purpose OS.

What is claimed is:

1. A computer system comprising:
   a CPU;
   a memory;
   a bus;
   an IO bridge which connects an IO device to the bus; and
   a pseudo-IO bus bridge,
   wherein the pseudo-IO bus bridge is disconnected from the bus during a redundant configuration in which a second computer system is connected to the bus,
   wherein the second computer system comprises:
      a second CPU;
      a second memory; and
      a second IO bridge;
   wherein the pseudo-IO bus bridge holds a setting information of the IO bridge to emulate the second IO bridge during a stand-alone configuration in which the second computer system is disconnected from the bus, and
   wherein the computer system is configured such that a total amount of memory space assigned to the IO bridge, the second IO bridge, and the pseudo-IO bus bridge when the second computer system is connected to the bus is substantially the same as a total amount of memory space assigned to the IO bridge, the second IO bridge, and the pseudo-IO bus bridge when the second computer system is disconnected from the bus.

2. The computer system according to claim 1, further comprising means for assigning memory space to the pseudo-IO bus bridge in response to power-on during the stand-alone configuration.

3. The computer system according to claim 1, wherein the pseudo-IO bus bridge holds an initial setting information of the second IO bridge.

4. The computer system according to claim 3, further comprising means for copying the initial setting information held by the pseudo-IO bus bridge to the second IO bridge during the redundant configuration.

5. The computer system according to claim 1, wherein the pseudo-IO bus bridge holds the most recent setting information of the second IO bridge.

6. A fault tolerant system wherein the computer system according to any of claims 1 to 5 is configured as the redundant configuration.

7. A operation control method of a fault tolerant system comprising first and second computer systems interconnected through a bus to form a redundant configuration, each of the first and second computer systems comprising a CPU, a memory, and an IO bridge for connecting an IO device to the bus, wherein the first computer system comprises a pseudo-IO bus bridge emulating the IO bridge of the second computer system, the method comprising:
   causing the pseudo-IO bus bridge to hold an initial setting information of the IO bridge of the second computer system during a stand-alone configuration;
   forming the redundant configuration; and
   disconnecting the pseudo-IO bus bridge from the bus and copying the initial setting information held by the pseudo-IO bus bridge to the IO bridge of the second computer system during the redundant configuration,
   wherein a total amount of memory space assigned to the IO bridge of the first computer system, the IO bridge of the second computer system, and the pseudo-IO bus bridge during the stand-alone configuration is substantially the same as a total amount of memory space assigned to the IO bridge of the first computer system, the IO bridge of the second computer system, and the pseudo-IO bus bridge during the redundant configuration.

8. The operation control method according to claim 7, further comprising assigning memory space to the pseudo-IO bus bridge in response to power-on during the stand-alone configuration.

9. The operation control method according to claim 7, further comprising holding the most recent setting information of the IO bridge of the second computer system during the redundant configuration.

10. A computer-readable storage medium storing a program for performing a operation control method of a fault tolerant system, the fault tolerant system comprising first and second computer systems interconnected through a bus to form a redundant configuration, each of the first and second computer systems comprising a CPU, a memory, and an IO bridge for connecting an IO device to the bus, wherein the first computer system comprises a pseudo-IO bus bridge emulating the IO bridge of the second computer system, the control method comprising:
   a process for causing the pseudo-IO bus bridge to hold an initial setting information of the second computer system during a stand-alone configuration;
   a process for forming the redundant configuration; and
   a process for disconnecting the pseudo-IO bus bridge from the bus and copying the initial setting information held by the pseudo-IO bus bridge to the IO bridge of the second computer system during the redundant configuration,
   wherein a total amount of memory space assigned to the IO bridge of the first computer system, the IO bridge of the second computer system, and the pseudo-IO bus bridge during the stand-alone configuration is substantially the same as a total amount of memory space assigned to the IO bridge of the first computer system, the IO bridge of the second computer system, and the pseudo-IO bus bridge during the redundant configuration.

* * * * *